Patented Jan. 11, 1949

2,458,584

UNITED STATES PATENT OFFICE 2,458,584

METHYLENE SULFONATE DERIVATIVES OF ALKYL COMPOUNDS AND ARYL COMPOUNDS

Harris L. Friedman, New York, and Leo D. Braitberg, Yonkers, N. Y., assignors to Pyridium Corporation, Yonkers, N. Y., a corporation of New York No Drawing. Application June 29, 1945,
Serial No. 602,404

6 Claims. (Cl. 260—296)

Our invention relates to and has for its object, new chemical compounds which are more stable than the original base and hence are useful as intermediates in the production of dyes and other compounds, and some of which have therapeutic properties and are useful for devitalizing bacteria and rendering them harmless of inocuous.

While the basic compounds from which we have formed the new therapeutic compounds of our invention have therapeutic properties, their physical and chemical properties are such as to render their proper application somewhat difficult and they require considerable care in their successful application.

These basic compounds are generally oily liquids, or low melting solids, practically insoluble in water and are somewhat unstable, coloring upon standing, and the decomposition product may be toxic and deleterious, and their acid salts are generally too acid for injection purposes.

One of the objects of our invention, therefore, is to produce new compounds which, while possessing therapeutic properties, will have none of the mentioned, and other disadvantages of the corresponding basic compounds.

We have found that the alkali methylene sulfonate salts of these basic compounds possess highly therapeutic values over those of their corresponding basic compounds.

These therapeutic compounds of our invention are dry, stable powders and hence they can be administered in combination with food, in capsules, in tablet form, or parenterally injected in the form of a solution, and they, therefore, possess highly valuable physical, stable and administrative properties over their corresponding basic compounds.

We have found further, that these therapeutic compounds of our invention are particularly valuable in their effectiveiness against Mycobacterium tuberculosis, although their usefulness is not limited to that particular disease, and that this effectiveness in the treatment of disease is greater than that possessed by the corresponding basic compounds.

We have found, further, that these therapeutic compounds of our invention are less toxic than the corresponding basic compounds, and that they also possess the additional unexpected property of being practically unaffected in their anti-bacteria action in the presence of such biological inhibitory substances as p-aminobenzoic acid, peptones, serum, pus, etc., which are present in living organisms, which substances seriously reduce the effectiveness of other compounds.

This action of these therapeutic compounds of our invention against Mycobacterium tuberculosis is particularly unexpected and remarkable as they are relatively without effect against other pathogenic organisms such as *E. coli.*, *Staphylococcus aureus* and *Streptococcus pyogenes*.

Further, substances which were hitherto known to have activity against Mycobacterium tuberculosis, such as certain sulfonamide and related compounds, are greatly, if not completely, inhibited in the presence of biological inhibitory substances, which is known to account for the lack of sufficient tuberculosis activity of those previously known compounds.

Some of the inhibitory substances which are present in the human organism include para-aminobenzoic acid, serum, peptones, pus and other protein degradation products which have high content of inhibitory substances. Some of these inhibitory substances in the lesions of tuberculosis and other diseases, which produce large amounts of tissue breakdown, play a very important role in the inhibition of sulfonamide and sulfone compounds, and as a result of this inhibitory mechanism, therapeutic trials on the whole failed.

The activity of therapeutic compounds of our invention against Mycobacterium tuberculosis is not diminished, when p-aminobenzoic acid, peptones, serum, pus, etc., are present. We have found that these compounds of our invention inhibit the growth of various strains of tuberculosis organisms in various dilutions, some diluted as high as one part to 25 million, depending upon the medium and strain of tuberculosis organism used.

As these inhibitory substances are present in the tubercular host, it is impossible to produce the desired therapeutic effect with sulfonamide and sulfone compounds, and hence any compounds which would practically retain their bacteriostatic properties irrespective of the inhibitory substances present would be of the highest value.

This property of the therapeutic compounds included within our invention of being practically uninhibited in bacteriostatic effectiveness, and especially in bacteriostatic effect against Mycobacterium tuberculosis, is entirely unexpected and cannot be predicated upon any prior knowledge relative to previously known bacteriostatic compounds, and is of the greatest importance and value in the treatment of infection.

By "inhibitory substances" in our specification and claims, we mean those substances which prevent the bacteriostatic action normally manifested by compounds in their absence, but which do not inhibit the bacteriostatic activities of the therapeutic compounds of our invention.

We have found that when adequate precautions are taken to administer our compounds in such a manner and with such frequency as to insure a desired concentration of the respective compounds in the blood stream, they are effective in the treatment of tuberculosis.

Another advantage of the compounds of our invention is that following administration by whatever route chosen, concentration of the respective compounds in the blood of the recipient animals are higher and can be maintained with greater safety than is possible with the corresponding basic compounds.

The general formula of the compounds of our invention is

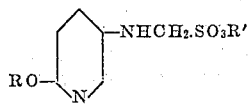

in which R represents a saturated or unsaturated alkyl radical with not more than eight carbon atoms such as ethyl-, propyl-, butyl-, amyl-, hexyl-, heptyl-, actyl-, isopropyl-, isobutyl-, secondary butyl-, tertiary butyl-, isoamyl-, diethylmethyl-, dipropylmethyl-, allyl-, methoxyethyl-, ethoxyethyl-, and butoxyethyl-, or saturated and unsaturated aryl radicals such as phenyl-, naphthyl-, benzyl-, betapyridyl-, furfuryl-, p-aminophenyl-, p-aminobenzyl-, cyclohexyl-, tetrahydrofurfuryl-, phenyloxyethyl-, and benzyloxyethyl-, and R' is hydrogen or an alkali metal.

The general formula for the basic compounds from which we produce the compounds of our invention is

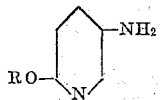

in which R represents a saturated or unsaturated alkyl radical with not more than eight carbon atoms, or a saturated or unsaturated aryl radical.

In producing our new compounds we react the free amine or the hydrochloride of the basic compounds dissolved in alcohol, or other suitable inert solvent, with formaldehyde and an alkali metal bisulfite, such as sodium bisulfite or potassium bisulfite.

The following are examples of our processes for the production of the indicated compounds of our invention.

*Example I*

830 grams freshly distilled 2-butoxy, 5-amino pyridine were dissolved in a mixture of 425 ccs. water and 425 ccs. concentrated hydrochloric acid and the solution was cooled to 16° C. Then 385 ccs. formaldehyde solution (37% U. S. P.) were added understirring. The temperature rose to 30° C. in about 1½ minutes. One liter of sodium bisulfite solution, containing 550 grams sodium bisulfite, was added under stirring. The temperature rose to 50° C. After 10 minutes stirring another liter of bisulfite solution of the same strength was added. The stirring was continued for 1½ hours, when the temperature was 35° C. The solution was then poured slowly into 7 liters 95% ethanol, forming an orange colored solution. It was then neutralized with 20% sodium hydroxide solution (860 ccs.) to pH 7.0, temperature 35° C. The clear pale yellow solution was placed in a refrigerator. The next day the flask was found filled with crystals. The crystals were collected on a Buchner filter and washed with 95% ethanol. The collected product was recrystallized from dilute, about 30%, ethanol.

The product forms white lustrous, plate like crystals and analysis confirmed the formula of

2-butoxy, 5-aminopyridine sodium methylene sulfonate, dihydrate.

The anhydrous product was obtained by drying at 110° C.

*Example II*

310 grams of sodium bisulfite and 203 ccs. 37% formaldehyde were dissolved in 1300 ccs. of water. 442 grams of freshly distilled 2-butoxy, 5-aminopyridine were added to this solution, and the reaction mixture was then heated in a hot water bath with continuous stirring between 50°–100° C. until the amine was completely dissolved. On cooling a copious precipitate of lustrous crystals were formed. The crystals were collected on a filter and washed with cold alcohol, and dried at 110° C. A second crop of crystals was obtained from the filtrate on concentration and cooling. The compound thus formed was 2-butoxy, 5-aminopyridine sodium methylene sulfonate.

*Example III*

2-ethoxy, 5-aminopyridine sodium methylene sulfonate was prepared as in Example I by dissolving 2.1 grams 2-ethoxy, 5-aminopyridine dihydrochloride in 10 ccs. water, and treating the solution thus formed with 0.81 ccs. 37% formaldehyde solution and 1.2 grams sodium bisulfite in 2 ccs. of water. The solution was neutralized with sodium hydroxide solution to pH 7.0 and crystallized with ethanol as in Example I. The product is 2-ethoxy, 5-aminopyridine sodium methylene sulfonate.

*Example IV*

2 grams 2-hexyloxy, 5-aminopyridine dihydrochloride were dissolved in 10 ccs. water and 0.56 ccs. 37% formaldehyde solution were added. Some oily droplets separated, which were put in solution by adding a few ccs. of methanol. One and a half minutes later, a solution of 0.85 grams sodium bisulfite in 1.2 ccs. of water were added and then neutralized with sodium hydroxide solution as in Example I. The turbid solution was heated with charcoal, filtered, and the product, 2-hexyloxy, 5-aminopyridine sodium methylene sulfonate, crystallized out in white, lustrous, pearly plates.

*Example V*

3 grams n-octyloxy, 5-aminopyridine dihydrochloride were dissolved in 15 ccs. water and 0.81 ccs. 37% formaldehyde solution were added, forming immediately a flocculent precipitate. This precipitate was not dissolved when 1.2 grams sodium bisulfite in 6 ccs. of water were added. It was then neutralized with a 2 ccs. of 40% sodium hydroxide solution and then 95% ethanol was added, heated for solution and cooled to crystallize. The product is n-octyloxy, 5-aminopyridine sodium methylene sulfonate.

Example VI 2.0 grams 2-diethylmethoxy, 5-aminopyridine dihydrochloride were dissolved in 3 ccs. of water and 0.6 ccs. 37% formaldehyde solution were added. The solution warmed, and after cooling a solution of 1.0 gram sodium bisulfite in 2 ccs. of water was added. After a half an hour the mixture was neutralized to pH 7.0 with 20% sodium hydroxide solution and the copious white crystalline precipitate was dissolved with the addition of 5 ccs. 75% ethanol and heating. The solution was cooled and the lustrous plate crystals of 2-diethylmethoxy, 5-aminopyridine sodium methylene sulfonate was collected on a filter, washed with ethanol and dried.

Example VII 2-allyloxy, 5-aminopyridine sodium methylene sulfonate was prepared as in Example I by dissolving 2 grams 2-allyloxy, 5-aminopyridine dihydrochloride in 15 ccs. water, and treating same with 0.68 ccs. 37% formaldehyde solution and 1 gram sodium bisulfite in 1.6 ccs. of water. The solution was neutralized with sodium hydroxide solution, the crystals collected and washed with acetone. The compound thus formed is 2-allyloxy, 5-aminopyridine sodium methylene sulfonate.

Example VIII 2.4 grams 2-methoxyethoxy, 5-aminopyridine dihydrochloride were dissolved in 7 ccs. water and 1 cc. of formaldehyde solution was added to the clear solution. After 2 minutes a solution of 1.5 grams sodium bisulfite in 2.3 ccs. distilled water was added. The mixture was then neutralized with sodium hydroxide solution. No precipitate resulted even after cooling the solution. The solution was then evaporated to dryness on steam bath and the solid residue dissolved in 50 ccs. boiling 95% ethanol. The solution was filtered and on chilling voluminous crystalline material came out. The crystals, 2-methoxyethoxy, 5-aminopyridine sodium methylene sulfonte were collected on a filter, washed with chilled 95% ethanol and dried.

Example IX 2-cyclohexyloxy, 5-aminopyridine sodium methylene sulfonate was prepared from 2.7 grams 2-cyclohexyloxy, 5-aminopyridine dihydrochloride the same way as in Example I. The produce forms a snow white powdery solid and is 2-cyclohexyloxy, 5-aminopyridine sodium methylene sulfonate.

Example X 2-phenyloxy, 5-aminopyridine sodium methylene sulfonate was prepared as in Example I by dissolving 2.5 grams 2-phenyloxy, 5-aminopyridine dihydrochloride in 10 ccs. water, and treating it with 0.81 ccs. 37% formaldehyde solution and 1.2 grams sodium bisulfite dissolved in 6 ccs. of water. The solution was neutralized with sodium hydroxide solution to pH 7.0. The mixture was cooled and the snow white crystalline precipitate collected and washed with 95% ethanol. The product thus formed was 2-phenyloxy, 5-aminopyridine sodium methylene sulfonate.

Example XI 2 grams 2-betapyridyloxy, 5-aminopyridine were dissolved in 6 ccs. water and 1 cc. conc. hydrochloric acid and 0.81 ccs. 37% formaldehyde solution was added. After 1½ minutes, 1.5 grams sodium bisulfite dissolved in 3 ccs. water were added. After standing 10 minutes copious crystalline precipitate formed. The mixture was then neutralized with sodium hydroxide to pH 7.0 redissolving the precipitate. After cooling on ice the product, 2-betapyridyloxy, 5-aminopyridine sodium methylene sulfonate crystallizes in white crystals. These were collected on a filter and washed with 95% ethanol.

The products formed as described in the foregoing examples are similar in their characteristics. They are generally of white crystalline or powder form and are all very soluble in water and no free amine is present.

The activity of some of the compounds included in our invention against Mycobacterium tuberculosis are tabulated below. The figures indicate the highest dilution that still inhibits the growth of Mycobacterium tuberculosis under a particular set of experimental conditions as regards inoculum, culture, etc., thereby making a comparable series.

| Name of compound | Highest dilution showing bacteriostasis |
|---|---|
| 2-ethoxy, 5-aminopyridine sodium methylene sulfonate | 1/25,000 |
| 2-butoxy, 5-aminopyridine sodium methylene sulfonate | 1/1,600,000 |
| 2-hexyloxy, 5-aminopyridine sodium methylene sulfonate | 1/1,600,000 |
| 2-octyloxy, 5-aminopyridine sodium methylene sulfonate | 1/25,000 |
| 2-diethylmethoxy, 5-aminopyridine sodium methylene sulfonate | 1/1,600,000 |
| 2-allyloxy, 5-aminopyridine sodium methylene sulfonate | 1/100,000 |
| 2-methoxyethoxy, 5-aminopyridine sodium methylene sulfonate | 1/25,000 |
| 2-cyclohexyloxy, 5-aminopyridine sodium methylene sulfonate | 1/3125 |
| 2-phenyloxy, 5-aminopyridine sodium methylene sulfonate | 1/3125 |
| 2-betapyridyloxy, 5-aminopyridine sodium methylene sulfonate | 0 |

The therapeutic compounds of our invention, therefore, present highly valuable and unexpected bacteriostatic properties especially against such bacteria as cause tubercular infections, although their usefulness is not limited to that particular disease.

We do not limit ourselves to the specific limitations mentioned, as these are given solely for the purpose of clearly describing our invention as set forth herein.

What we claim is:

1. Compounds having the general formula:

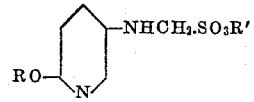

in which R is a member selected from the group consisting of alkyl radicals having not more than eight carbon atoms and aryl radicals and in which R' is a member selected from the group consisting of hydrogen and alkali metals.

2. Compounds having the general formula:

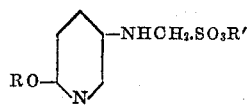

in which R is a member selected from the group consisting of alkyl radicals having not more than eight carbon atoms, and in which R' is a member selected from the group consisting of hydrogen and alkali metals.

3. Compounds having the general formula:

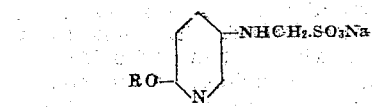

in which R is a member selected from the group consisting of alkyl radicals having not more than eight carbon atoms and aryl radicals.

4. 2-butoxy, 5-aminopyridine sodium methylene sulfonate.

5. 2-hexyloxy, 5-aminopyridine sodium methylene sulfonate.

6. 2-diethylmethoxy, 5-aminopyridine sodium methylene sulfonate.

HARRIS L. FRIEDMAN.
LEO D. BRAITBERG.

No references cited.